US011887267B2

(12) United States Patent
Goodman et al.

(10) Patent No.: US 11,887,267 B2
(45) Date of Patent: Jan. 30, 2024

(54) GENERATING AND MODIFYING REPRESENTATIONS OF HANDS IN AN ARTIFICIAL REALITY ENVIRONMENT

(71) Applicant: Meta Platforms Technologies, LLC, Menlo Park, CA (US)

(72) Inventors: Christopher James Goodman, Round Rock, TX (US); Gregory Mayo Daly, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 257 days.

(21) Appl. No.: 17/369,354

(22) Filed: Jul. 7, 2021

(65) Prior Publication Data

US 2023/0009367 A1    Jan. 12, 2023

(51) Int. Cl.
*G06T 19/20* (2011.01)
*G06T 15/04* (2011.01)
(Continued)

(52) U.S. Cl.
CPC ............. *G06T 19/20* (2013.01); *G06T 7/75* (2017.01); *G06T 15/04* (2013.01); *G06T 15/506* (2013.01);
(Continued)

(58) Field of Classification Search
None
See application file for complete search history.

(56) References Cited

U.S. PATENT DOCUMENTS 9,002,099 B2    4/2015 Litvak
9,344,707 B2    5/2016 Lee et al.
(Continued)

FOREIGN PATENT DOCUMENTS

WO    WO 2012135554    10/2012

OTHER PUBLICATIONS

Caterina Battisti, Stefano Messelodi, Fabio Poiesi, "Seamless bare-hand interaction in Mixed Reality", Oct. 20, 2018, IEEE, 2018 IEEE International Symposium on Mixed and Augmented Reality Adjunct (ISMAR-Adjunct).*

(Continued)

*Primary Examiner* — Robert Bader
(74) *Attorney, Agent, or Firm* — Baker Botts L.L.P.

(57) ABSTRACT

A method includes receiving an image of a real environment captured using a camera worn by a user, the image comprising a hand of the user and determining a pose of the hand based on the image. Based on a three-dimensional model of the hand having the determined pose, generating a two-dimensional surface representing the hand as viewed from a first viewpoint of the user and positioning the two-dimensional surface representing the hand and one or more virtual-object representations in a three-dimensional space. The method further includes determining that a portion of the two-dimensional surface representing the hand is visible from a second viewpoint in the three-dimensional space, and generating an output image, wherein a set of image pixels of the output image corresponding to the portion of the two-dimensional surface that is visible is configured to cause a display to tur off a set of corresponding display pixels.

14 Claims, 9 Drawing Sheets

(51) Int. Cl.
　　*G06T 7/73*　　　(2017.01)
　　*G06T 15/50*　　(2011.01)
(52) U.S. Cl.
　　CPC ............ *G06T 2200/08* (2013.01); *G06T 2207/30196* (2013.01); *G06T 2210/12* (2013.01); *G06T 2210/62* (2013.01); *G06T 2219/2004* (2013.01)

(56) References Cited

U.S. PATENT DOCUMENTS

| | | | |
|---|---|---|---|
| 9,392,264 B1 | 7/2016 | Chang | |
| 10,261,594 B2 | 4/2019 | Marcolina | |
| 11,107,280 B1 | 8/2021 | Clohset et al. | |
| 11,392,211 B2 | 7/2022 | Holz | |
| 2012/0068913 A1* | 3/2012 | Bar-Zeev | G09G 3/001 345/8 |
| 2014/0204002 A1 | 7/2014 | Bennet | |
| 2016/0093108 A1 | 3/2016 | Mao | |
| 2017/0140552 A1 | 5/2017 | Woo | |
| 2017/0372510 A1 | 12/2017 | Ye | |
| 2018/0275748 A1* | 9/2018 | Haraden | G06T 15/503 |
| 2019/0325661 A1 | 10/2019 | Baumbach | |
| 2020/0118341 A1* | 4/2020 | Ohashi | H04N 9/75 |
| 2020/0225761 A1 | 7/2020 | Sinha | |
| 2020/0311397 A1 | 10/2020 | Sawhney et al. | |
| 2020/0334877 A1 | 10/2020 | Pokorny | |
| 2020/0401804 A1 | 12/2020 | Grundhoefer et al. | |
| 2022/0206298 A1 | 6/2022 | Goodman | |
| 2022/0262065 A1 | 8/2022 | Godbole | |

OTHER PUBLICATIONS

International Search Report and Written Opinion for International Application No. PCT/US2020/012829, 11 pages, dated Apr. 30, 2021.

Reinert, et al., Proxy-guided Image-based Rendering for Mobile Devices, Computer Graphics Forum, vol. 35, No. 7, 10 pages, 2016.

International Search Report and Written Opinion for International Application No. PCT/US2020/012829, dated Jun. 26, 2020, 17 Pages.

Mueller F., et al., "Real-Time Hand Tracking under Occlusion from an Egocentric RGB-D Sensor," IEEE International Conference on Computer Vision, downloaded on Aug. 25, 2023, 10 pages.

Nanni L., et al. "Combination of Depth and Texture Descriptors for Gesture Recognition," Advances in Machine Learning Research, Jun. 2014, 35 pages.

Wang C., et al., "Superpixel-Based Hand Gesture Recognition with Kinect Depth Camera," IEEE Transactions on Multimedia, 2014, vol. 17, No. 1, pp. 29-39, downloaded on Aug. 25, 2023.

* cited by examiner

GENERATING AND MODIFYING REPRESENTATIONS OF HANDS IN AN ARTIFICIAL REALITY ENVIRONMENT

TECHNICAL FIELD

This disclosure generally relates to augmented-reality, virtual-reality, mixed-reality, or hybrid-reality environments.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display connected to a host computer system, a standalone head-mounted display, a mobile device or computing system, or any other hardware platform capable of providing artificial reality content to one or more viewers.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Disclosed methods provide techniques for generating and modifying representations of hands of a user in AR/VR/MR environments by generating and positioning one or more surfaces that may represent a hand of a user. In particular embodiments, a surface representing the hand may be generated based on a three-dimensional model of a hand having a determined pose, wherein the pose is determined based on a received image captured by one or more cameras associated with an artificial reality system. The two-dimensional surface representing the hand may represent the hand as viewed from a viewpoint of the user. The two-dimensional surface representing the hand and one or more virtual-object representations may be positioned in a three-dimensional space. The position may be further based on a viewpoint of a user of the artificial reality system. The methods disclosed further include determining that a portion of the two-dimensional surface representing the hand is visible from a second viewpoint in the three-dimensional space, and generating an output image, wherein a set of image pixels of the output image corresponding to the portion of the two-dimensional surface that is visible is configured to cause a display to tur off a set of corresponding display pixels. In doing so, the computing system may accurately predict and generate a view of an immersive artificial reality environment to the user of the HMD.

Disclosed methods also provide techniques for generating and modifying representations of a shadow of a hand of a user in AR/VR/MR environments by generating and positioning one or more surfaces that may represent a shadow of a hand of a user. In particular embodiments the computing system may generate a second two-dimensional surface representing the shadow of the hand based on a determined light direction of a light source and a three-dimensional model of the hand. The two-dimensional surface representing the shadow of the hand may represent the shadow of the hand as viewed from a viewpoint of the user. The two-dimensional surface representing the shadow of the hand may be positioned in a three-dimensional space. The position may be further based on a viewpoint of a user of the artificial reality system. The methods disclosed further include determining that a portion of the two-dimensional surface representing the shadow of the hand is visible from a second viewpoint in the three-dimensional space, and generating an output image, wherein a set of image pixels of the output image corresponding to the portion of the two-dimensional surface that is visible is configured to cause a display to tur off a set of corresponding display pixels.

In particular embodiments, the generated image may be rendered by one or more components (e.g., CPU, GPU, etc.) of a computing system associated with a device (e.g., a laptop, a cellphone, a desktop, a wearable device). In particular embodiments, the device is in communication with a computing system on the HMD but may be otherwise physically separated from the HMD. As an example and not by way of limitation, this device may be a laptop device that is wired to the HMD or communicates wirelessly with the HMD. As another example and not by way of limitation, the device may be a wearable (e.g., a device strapped to a wrist), handheld device (e.g., a phone), or some other suitable device (e.g., a laptop, a tablet, a desktop) that is wired to the HMD or communicates wirelessly with the HMD. In particular embodiments the device may send this initial view to the HMD for display. In particular embodiments the components of the device that generated the initial view may also generate the one or more surfaces representing the object of interest for the view. As another example and not by way of limitation, an onboard computing system of an HMD may resample and adjust the pose of the one or more surfaces after it receives the initial view from a separate computing system (e.g., from a CPU or GPU of a wearable, handheld, or laptop device) to account for movements of the HMD and/or object of interest that may occur while rendering the initial image.

In particular embodiments, graphics applications (e.g., games, maps, content-providing apps, etc.) may build a scene graph, which is used together with a given view position and point in time to generate primitives to render on a GPU. The scene graph may define the logical and/or spatial relationship between objects in the scene. In particular embodiments, a display engine may also generate and store a scene graph that is a simplified form of the full application scene graph. The simplified scene graph may be used to specify the logical and/or spatial relationships between surfaces (e.g., the primitives rendered by display engine, such as quadrilaterals or contours, defined in 3D space, that have corresponding textures generated based on the mainframe rendered by the application). Storing a scene graph allows display engine to render the scene to multiple display frames, adjusting each element in the scene graph for the current viewpoint (e.g., head position), the current object positions (e.g., they could be moving relative to each other) and other factors that change per display frame. In addition, based on the scene graph, display engine may also adjust for the geometric and color distortion introduced by the display subsystem and then composite the objects together to generate a frame. Storing a scene graph allows display engine to approximate the result of doing a full render at the desired high frame rate, while actually running the GPU at a significantly lower rate.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
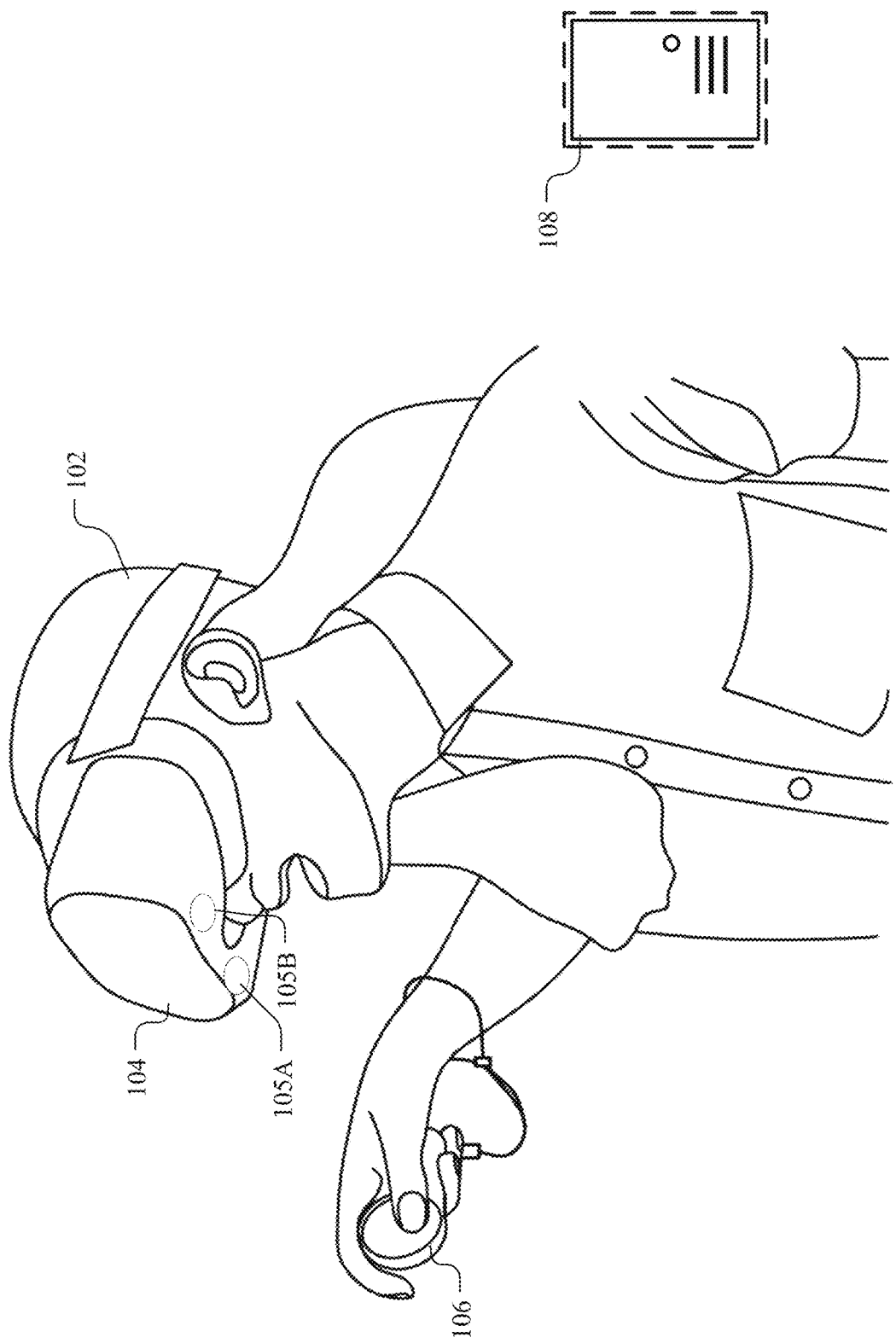
FIG. 1A illustrates an example artificial reality system and user.

FIG. 1A illustrates an example artificial reality system 100 and user 102. In particular embodiments, the artificial reality system 100 may comprise a headset 104, a controller 106, and a computing system 108. A user 102 may wear the headset 104 that may display visual artificial reality content to the user 102. The HMD 104 may include an audio device that may provide audio artificial reality content to the user 102. The headset 104 may include an eye tracking system to determine a vergence distance of the user 102. A vergence distance may be a distance from the user's eyes to objects (e.g., real-world objects or virtual objects in a virtual space) upon which the user's eyes are converged. The headset 104 may be referred to as a head-mounted display (HMD). One or more controllers 106 may be paired with the artificial reality system 100. In particular embodiments, one or more controllers 106 may be equipped with at least one inertial measurement units (IMUs) and infrared (IR) light emitting diodes (LEDs) for the artificial reality system 100 to estimate a pose of the controller and/or to track a location of the controller, such that the user 102 may perform certain functions via the controller 106. In particular embodiments the one or more controllers 106 may be equipped with one or more trackable markers distributed to be tracked by the computing system 108. The one or more controllers 106 may comprise a trackpad and one or more buttons. The one or more controllers 106 may receive inputs from the user 102 and relay the inputs to the computing system 108. The one or more controllers 106 may also provide haptic feedback to the user 102. The computing system 108 may be connected to the headset 104 and the one or more controllers 106 through cables or wireless connections. The one or more controllers 106 may include a combination of hardware, software, and/or firmware not explicitly shown herein so as not to obscure other aspects of the disclosure.

The artificial reality system 100 may further include a computer unit 108. The computer unit may be a stand-alone unit that is physically separate from the HMD or it may be integrated with the HMD. In embodiments where the computer 108 is a separate unit, it may be communicatively coupled to the HMD via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

Figure 1B:
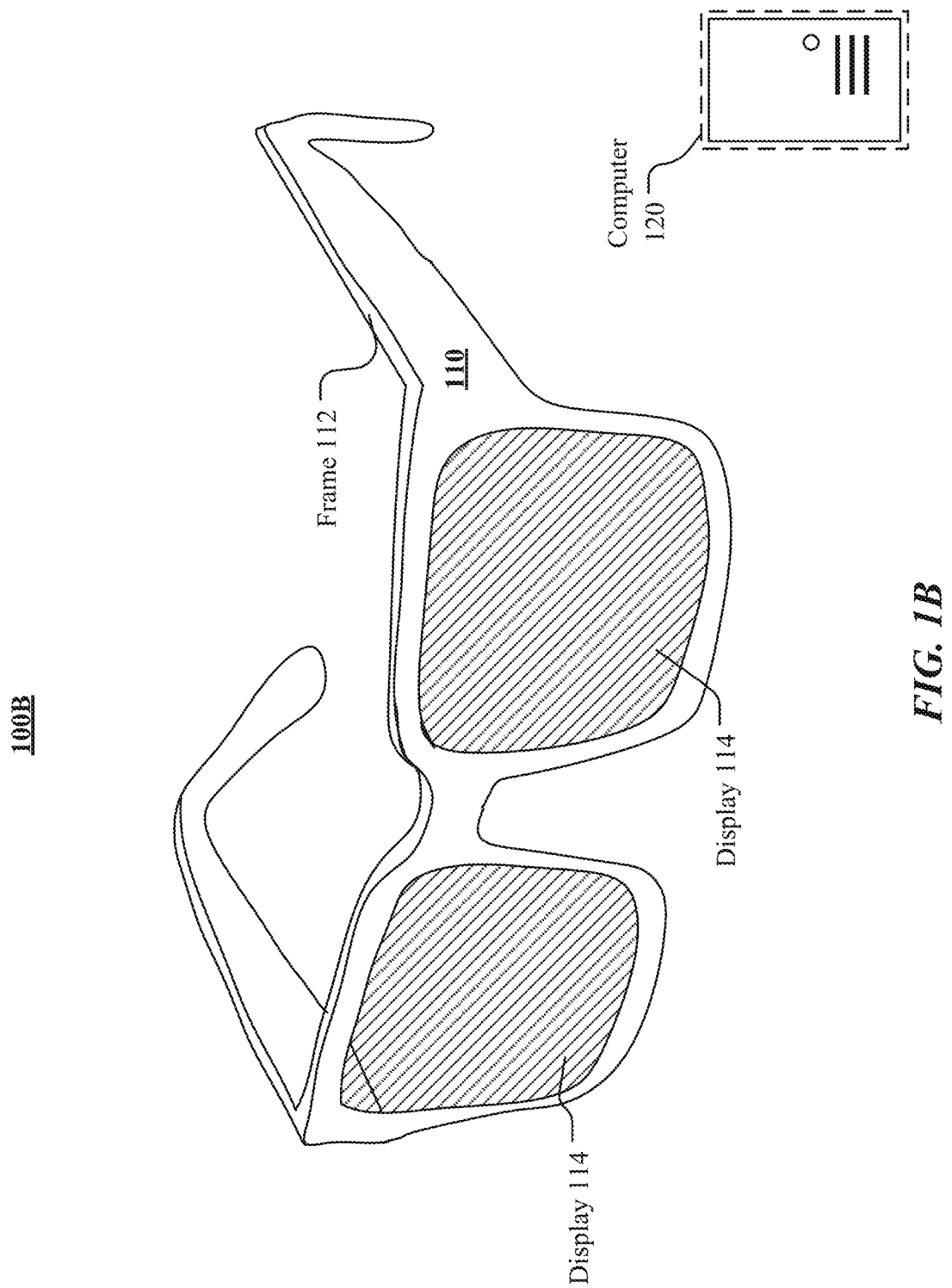
FIG. 1B illustrates an example augmented reality system.

FIG. 1B illustrates an example augmented reality system 100B. The augmented reality system 100B may include an augmented reality head-mounted display (AR HMD) 110 (e.g., glasses) comprising a frame 112, one or more displays 114, and a computing system 120. The displays 114 may be transparent or translucent allowing a user wearing the AR HMD 110 to look through the displays 114 to see the real world and displaying visual artificial reality content to the user at the same time. The AR HMD 110 may include an audio device that may provide audio artificial reality content to users. The AR HMD 110 may include one or more cameras which can capture images and videos of environments. The AR HMD 110 may include an eye tracking system to track the vergence movement of the user wearing the AR HMD 110. Except as where specified throughout this application, the use of "HMD" can be used to refer to either HMD 104 (which may occlude the user's view of the real environment) or AR HMD 110 (which may permit the user to see the real world and displaying visual artificial reality content to the user at the same time).

The augmented reality system 100B may further include a controller comprising a trackpad and one or more buttons. The controller may receive inputs from users and relay the inputs to the computing system 120. The controller may also provide haptic feedback to users. The computing system 120 may be connected to the AR HMD 110 and the controller through cables or wireless connections. The computing system 120 may control the AR HMD 110 and the controller to provide the augmented reality content to and receive inputs from users. The computing system 120 may be a standalone host computer system, an on-board computer system integrated with the AR HMD 110, a mobile device, or any other hardware platform capable of providing artificial reality content to and receiving inputs from users.

The HMD may have external-facing cameras, such as the two forward-facing cameras 105A and 105B shown in FIG. 1A. While only two forward-facing cameras 105A-B are shown, the HMD may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras 105A and 105B are configured to capture the physical environment around the user and may do so continuously to generate a sequence of frames (e.g., as a video).

In particular embodiments, the pose (e.g., position and orientation) of the HMD within the environment may be needed. For example, in order to render an appropriate display for the user 102 while he is moving about in a virtual or augmented reality environment, the system 100 would need to determine his position and orientation at any moment. Based on the pose of the HMD, the system 100 may further determine the viewpoint of either of the cameras 105A and 105B or either of the user's eyes. In particular embodiments, the HMD may be equipped with inertial-measurement units ("IMU"). The data generated by the IMU, along with the stereo imagery captured by the external-facing cameras 105A-B, allow the system 100 to compute the pose of the HMD using, for example, SLAM (simultaneous localization and mapping) or other suitable techniques.

Since its existence, artificial reality (e.g., Augmented Reality (AR), Virtual Reality (VR), Mixed Reality (MR)) technology has been plagued with the problem of latency in rendering AR/VR/MR representations of objects in response to sudden changes in a user's perspective and/or sudden changes in the AR/VR/MR view displayed to the user. For example, users may suddenly need to be able to move their heads around when viewing a scene and the rendered image may need to respond immediately by adjusting the view of one or more virtual representations presented to the user. A particular challenge is accurately rendering and displaying one or more hands of a user of an artificial reality device. A user may make frequent subtle movements with their hands that may be small but sporadic and difficult (if not impossible) to predict. Further, there is a need to accurately render and display shadows that correspond to the one or more hands of the user. These shadows may result from a real light source in a real environment (e.g., the sun or a lamp), or from a virtual light source from one or more virtual objects in an artificial reality environment (e.g., a virtual lamp or virtual candle).

Moreover, hand movements may occur quickly, requiring that the rendered view of the artificial reality environment be modified rapidly to account for changes in perspective that occur. If this is not done rapidly enough, the resulting latency may cause a user to experience a sensory dissonance that can lead to virtual reality sickness or discomfort, or at the very least, a disruption to the immersive nature of the experience. For example, sudden movements may result in virtual content that is rendered and improperly displayed over real objects. Further unlike many real objects in a real or artificial environment, the user's hands are highly dynamic and frequently interact with virtual objects in real environments. Without proper detection and adjustments for these hand movements or changes in perspective, these virtual objects may be improperly rendered over one or more hands that are closer to the user than the virtual object, resulting in a less-immersive experience. This is of particular importance with a user's hands, as a user of an artificial reality system may frequently look at their hands as they interact with objects in the artificial reality environment. As a result, users may be hyperaware of changes in perspective, latency, and improperly rendered virtual objects in relation to the user's hands. Thus, to properly address a user's expectation of AR immersion, virtual objects that fall behind the user's hands must be occluded and/or blended with the real objects around it. The failure to do so breaks the immersion of AR and the perception of depth of virtual content.

One solution to the problems faced when rendering a user's hands involves generating and resampling "surfaces." A surface may be one or more primitives rendered by display engine, such as quadrilaterals or contours, defined in 3D space, that have corresponding textures generated based on the mainframe rendered by the application. In particular embodiments one or more surfaces may represent a particular view of an objects within the artificial reality environment, where a surface corresponds to one or more objects that are expected to move/translate, skew, scale, distort, or otherwise change in appearance together, as one unit, as a result of a change in perspective. This method may allow for an efficient shortcut for adjusting a view in response to head movements of the user and/or one or more movements of the objects, and may significantly reduce the processing power that is required by rendering at a lower frame rate (e.g., 60 Hz, or once every $\frac{1}{60}$th of a second) and using the surfaces to adjust or interpolate the view to account for rapid movements of the user's hands, thus ensuring that the view is updated quickly enough to sufficiently reduce latency. This may further result in conservation of computing resources, which may be important for AR systems that utilize less-powerful components that are compact enough to be housed within an HMD, especially an AR HMD with a small form factor. Alternatively, the computing system may be capable of rendering the surfaces that represent the hand or shadows at a rate that matches the display rate of the HMD (e.g., 200 Hz, once every $\frac{1}{200}$th of a second). This prevents the user from perceiving latency and to thereby avoid or sufficiently reduce sensory dissonance. Methods for generating and modifying representations of objects in an augmented-reality or virtual reality environment are disclosed in U.S. patent application Ser. No. 16/586,590, filed 27 Sep. 2019, which is incorporated by reference.

At a high level, non-limiting embodiments disclosed herein permit a computing system associated with an artificial reality system to receive one or more images of a real environment that comprises at least a hand of a user and determine a pose of the hand. The computing system may generate a two-dimensional surface representing the hand based on a viewpoint of the user and position the two-dimensional surface and one or more virtual objects in a three-dimensional space, for example an artificial reality environment. The computing system may further determine a visibility of at least a portion of the two-dimensional surface from a second viewpoint (e.g. a second viewpoint resulting from one or more movements of the hands, the head of the user, changes in the artificial reality environment, etc. relative to the first viewpoint). The computing system may generate an output image, wherein a set of image pixels of the output image corresponding to the portion of the two-dimensional surface that is visible is configured to cause a display to turn off a set of corresponding display pixels.

An additional embodiment permit a computing system associated with an artificial reality system to generate a second generate a two-dimensional surface representing the shadow of the hand. Hand shadows offer many of the same challenges as hands when displayed in an artificial reality environment, and therefore must be generated with very little latency in order to produce a realistic, immersive experience. When a user's real hands are shown with traditional artificial reality techniques, the hands often look unnatural due to the inability to render accurate shadows, especially shadows that are projected on nearby virtual objects that the user may be interacting with. In particular embodiments the computing system may generate a two-dimensional surface representing the shadow of the hand based on a light direction of a light source and a three-dimensional model of the hand.

Embodiments may include or be implemented in conjunction with an artificial reality system. In particular embodiments, the processing tasks involved in rendering an artificial reality environment and generating and modifying its surfaces may be split among two or more computing systems. As an example and not by way of limitation, one or more surfaces representing the hand, a real object, etc. may be generated by a first computing system (e.g., a laptop, a cellphone, a desktop, a wearable device). In addition to texture, color, and transparency information, the surfaces may include information about their location in the artificial reality environment. These surfaces may be passed to a second computing system (e.g., an onboard computing system on an HMD). The HMD may warp the surfaces within the view based on the information associated with the surfaces (e.g., movement of the hand) and based on a current perspective of the user wearing the HMD (e.g., as determined by the position and orientation of the HMD). Any changes in the user's perspective (which may occur both due to e.g., (1) slight head motions of the user and (2) movements of the hand or other objects in the artificial reality environment), which may occur on the order of a hundredth of a second, may be tracked by received image data and sensors on the HMD and accounted for by resampling the surfaces in a view to render a time-adjusted viewpoint. Rendering a time-adjusted viewpoint may comprise determining that a portion of the surface representing the hand is visible from a second viewpoint in the three-dimensional space. Due to the adjustment of the viewpoint, the surfaces may be translated/moved, skewed, scaled, distorted, or otherwise changed in appearance when they are resampled. Since the view is not being re-rendered from scratch, the view can be modified relatively quickly (e.g., at 200 Hz). In particular embodiments, the first computing system may be relatively powerful when compared to the second computing system, because the second computing system (e.g., a HMD) may have limited system resources that may not appreciably be increased without resulting in too much weight, size, and/or heat for the user's comfort.

Figure 2A:
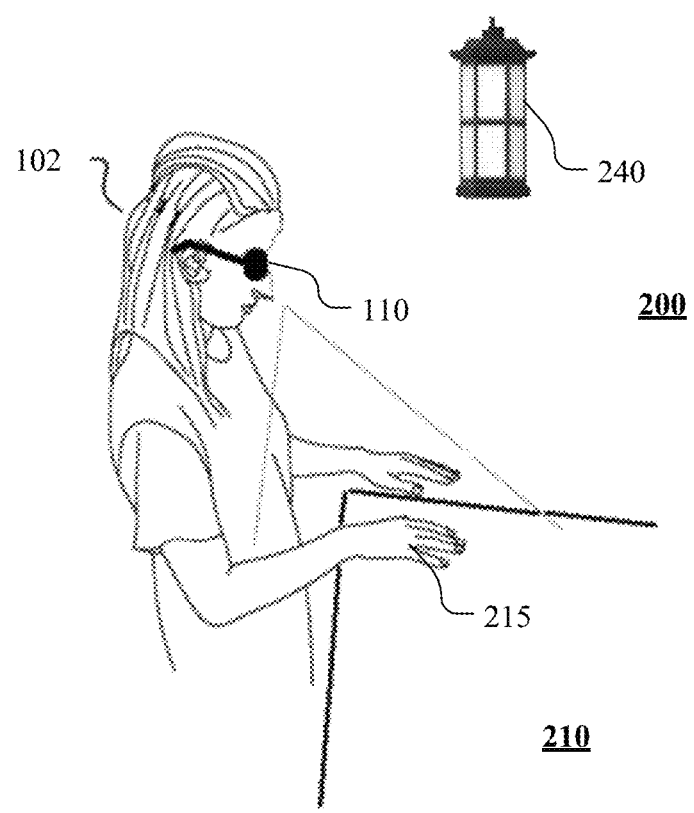
FIG. 2A illustrates a user of an AR HMD experiencing an artificial reality environment.
Figure 2B:
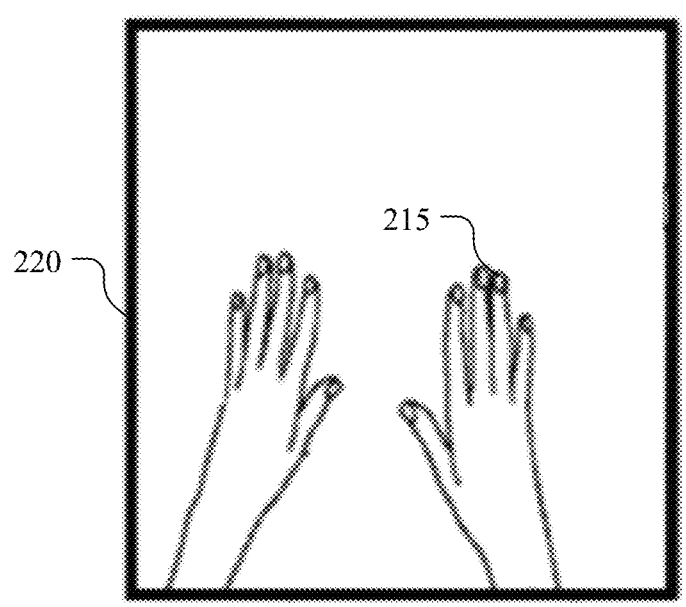
FIG. 2B illustrates an image of a real environment captured by one or more cameras associated with an artificial reality system.

FIG. 2A illustrates a user of an AR HMD experiencing an artificial reality environment. As user 102 moves throughout the artificial reality environment 200, the user may interact with both real and virtual objects, for example virtual table 210. In particular embodiments a computing system associated with an artificial reality system may receive an image of a real environment. FIG. 2B illustrates an image of a real environment captured by one or more cameras associated with an artificial reality system. The image 220 may be captured by one or more cameras associated with the artificial reality system, for example cameras 105A-B on the HMD worn by the user. In particular embodiments the camera worn by the user is connected to a head-mounted display. The image 220 may include at least a portion of one or more hands 215 of the user. In particular embodiments the image may be a monocular image at a lower resolution and framerate (e.g., 640×640 monochromatic images, alternating between left and right cameras, at 20 Hz).

In particular embodiments the computing system may determine a pose of the hand 215 based on the image 220. In particular embodiments the pose of the hand 215 may be based on the viewpoint of the user or pose of the camera when capturing the image 220. The computing system may further determine one or more motion or translation vectors associated with the hand based on the image (e.g., vectors that represent the current movement, velocity, acceleration, etc. of the hand). Using these vectors, the computing system may predict future hand poses or shadow poses based on the movement, velocity, acceleration, etc. of the hand at the time the image was captured. In particular embodiments the pose of the hand 215 may be based on one or more keypoint features determined from the images. Keypoint features may be determined by using for example a machine-learning model or any suitable image segmentation technique. Keypoint features refer to distinctive features of an object (e.g., the hand) that remain relatively invariant with respect to changes in scale, rotation, affine distortions, viewpoints, noise, or illumination. With respect to a hand, keypoint features may include, for example and not by way of limitation, the fingers, fingertips, joints, palm, or any other structure of interest. In particular embodiments, each keypoint may be represented as a two-dimensional coordinate, and the set of keypoints may be represented as an array or vector of coordinates. Although particular data representations for detected persons and segmentation information are described, this disclosure contemplates any suitable data representations of such information. In particular embodiments the computing system may determine coordinate points of the keypoint features within the real environment based on tracking algorithms. Each keypoint feature collected by the devices may be stored in a database, along with the coordinate points of the keypoint features and the device's camera pose at the time of capture. The database may be indexed based on the timestamps associated with each observation (e.g., the point in time the keypoint features were captured by the device).

Figure 3A:
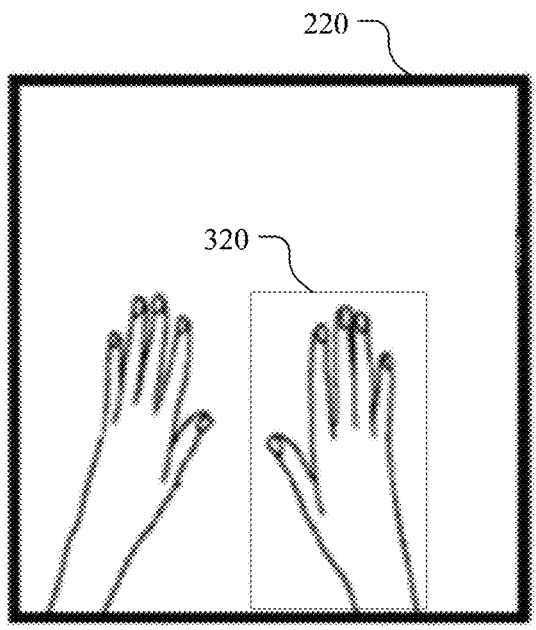
FIG. 3A illustrates a bounding box outputted based on a detected instance of a hand in an image.

In particular embodiments, the computing system may generate a bounding box that surrounds the hand 215. FIG. 3A illustrates a bounding box outputted based on a detected instance of a hand in an image. A rectangular bounding box 320 may be represented as four two-dimensional coordinates that indicate the four corners of the box. Upon determining a hand 215 is present, the computing system uses for example, a machine learning model (e.g., Mask R-CNN) to generate a 2D bounding box 320 comprising the hand 215 in the image 220. In particular embodiments, a bounding box may be the smallest or near smallest rectangle (or any other geometric shape(s)) that is able to fully contain the pixels comprising the hand. The computing system may render a texture for the two-dimensional surface based on the bounding box. In some non-limiting embodiments the size of the generated two-dimensional surface representing the hand may be based on the distance of the hand from the camera at the time the received image was captured. In this manner, the bounding box can be used as an FOV of interest to avoid rendering an unnecessarily large area, thereby conserving power and other computing resources.

The machine-learning model may comprise several high-level components, including a backbone neural network, also referred to as a trunk, a region proposal network (RPN), a detection head (e.g., a people detector), a keypoint head, and a segmentation head. Each of these components may be configured as a neural network, such that the machine learning model comprises one or more neural networks. Conceptually, the trunk is configured to process an image 200 and prepare a feature map (e.g., an inception of convolutional outputs) that represents the image 200. The RPN takes the feature map generated by the trunk and outputs N number of proposed regions of interest (RoIs) that may include one or more detected objects of interest, such as hand 215. The detection head may then detect which of the NRoIs are likely to contain the hand and output corresponding object detection indicators, which may define a smaller region, such as a bounding box, of the image 220 that contains the hand. For the RoIs deemed to be sufficiently likely to contain the hand, which may be referred to as target region definitions, the keypoint head may determine their respective keypoint mappings and the segmentation head may determine their respective segmentation masks.

In particular embodiments, the detection head, keypoint head, and segmentation head may perform their respective operations in parallel. In other embodiments, the detection head, keypoint head, and segmentation head may not perform their operations in parallel but instead adopt a multi-staged processing approach, which has the advantage of reducing computation and speeding up the overall operation. As described, the machine-learning model according to particular embodiments is compact and optimized for inference-time speed. Such optimizations may, in certain circumstances, result in the accuracy of the prediction results to be less than optimal. To compensate, particular embodiments may perform post-processing to correct or adjust the model's keypoint predictions. In particular, the keypoints predictions generated by the keypoint head may be automatically adjusted to reflect the more likely poses based on one or more learned poses of hands.

In particular embodiments the computing system may determine the distance of the hand from the camera based on the image, or based on sensor data received from by the artificial reality system that corresponds to the time the received image was captured. Using this distance, the computing system may cap or identify a maximum texture size to reduce the number of rendered pixels (e.g., when the hands are close to the user's viewpoint). Because objects naturally become blurry when viewed at a very close distance (e.g., due to physiological limitations that limit the ability to reduce to focal length of the eye), a natural and aesthetically pleasing experience can be obtained even with a maximum texture size.

In particular embodiments the computing system may determine a light direction of a light source in the artificial reality environment. Returning to FIG. 2A, a light source 240 may be present in the artificial reality environment. The light source may be a real light source, wherein light emanates from a real object in the real environment (e.g., a real lamp, a real candle, the sun, etc.) or the light source may be a virtual light source, wherein light emanates from a virtual object in the artificial reality environment the user is experiencing (e.g., a virtual lamp, a virtual television screen, etc.). The light direction of light source 240 may be determined based on data received from an artificial reality application the user is experiencing, or the light direction of light source 240 may be determined based on image data or sensor data received by the computing system. In particular embodiments the light direction may correspond with a time (e.g., the time the received image was captured).

Figure 3C:
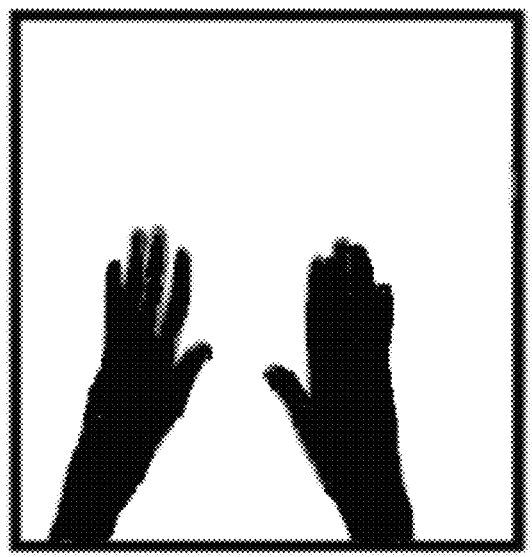
FIG. 3C illustrates a generated surface representing the hand of a user in an artificial reality environment.
Figure 3B:
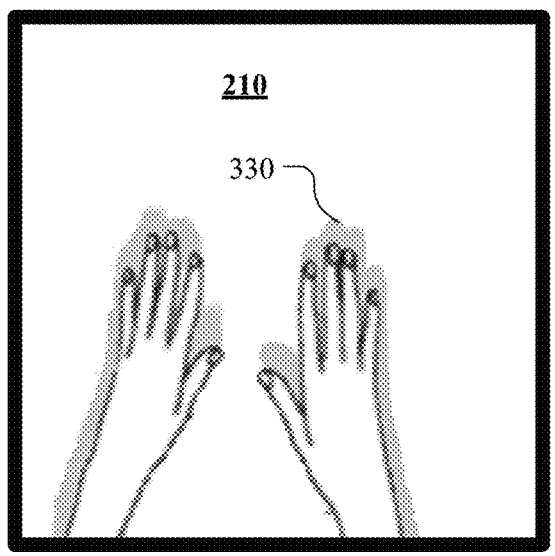
FIG. 3B illustrates a three-dimensional model of the hand projected onto a virtual object according to a determined light direction.

The computing system may project, according to the determined light direction, the three-dimensional model of the hand onto a virtual object in the artificial reality environment (e.g., a virtual table the user is standing over). FIG. 3B illustrates a three-dimensional model of the hand projected onto a virtual object according to a determined light direction. The three-dimensional model of the hand may be posed to represent hand at a particular time (e.g., the time the received image was captured). This technique allows the computing system to approximate the shadow 330 of the hand as it would appear on virtual object 210 based on a light source 240 in the artificial reality environment.

In particular embodiments the computing system may generate a surface representing the hand. FIG. 3C illustrates a generated surface representing the hand of a user in an artificial reality environment. The surface may be based on a three-dimensional model of the hand, which may be accessed or generated by the computing system using sensor data or image data captured by one or more cameras or sensors associated with the artificial reality system (e.g., the received image). For example, the computing system may generate the two-dimensional surface by projecting vertices of the triangles of the three-dimensional model of the hand onto an image plane associated with a viewpoint and rasterize the pixels to determine if each pixel is part of the hand or not, resulting in a 2D quad and alpha texture. In particular embodiments the two-dimensional surface may represent the appearance of the hand as viewed from a first viewpoint of the user, for example a viewpoint at the time the received image was captured by a camera associated with the artificial reality system. The computing system may alternatively or additionally render a surface based on the motion or translational vectors of the hand. An advantage of rendering the surface based on the vectors (rather than the determined pose of the hand) is the computing system can render at a faster rate than hand tracking may allow. For example, the computing system may determine a pose of the hand at an interval equivalent to the capture rate of the camera from which the image is received (e.g., 30 or 60 fps), and the surfaces may be rendered at a faster rate based on these vectors (e.g., at the display rate, for example 200 Hz).

Figure 3D:
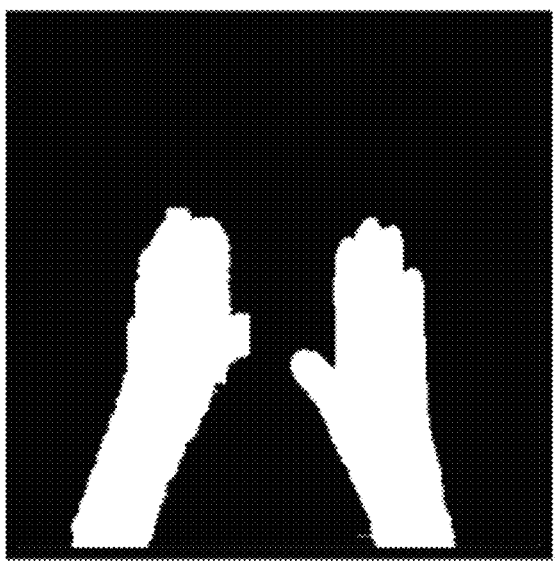
FIG. 3D illustrates a generated surface representing the shadow of a hand of a user in an artificial reality environment.

In particular embodiments the computing system may generate a two-dimensional surface representing a shadow of the hand on a virtual object (e.g., a virtual table) in the artificial reality environment as viewed from a viewpoint of the user. FIG. 3D illustrates a generated surface representing the shadow of a hand of a user in an artificial reality environment. The two-dimensional surface representing a shadow of the hand may be generated in addition to or separate from the two-dimensional surface representing the hand illustrated in FIG. 3C. In particular embodiments the two-dimensional surface may represent the appearance of the shadow of the hand as viewed from a first viewpoint of the user, for example a viewpoint at the time the received image was captured by a camera associated with the artificial reality system. In particular embodiments the appearance of the two-dimensional surface representing a shadow of the hand may be modified to more accurately portray a shadow, for example and not by way of limitation, by mapping the two-dimensional surface to grayscale, by blurring the edges of the two-dimensional surface representing a shadow of the hand (which may be more visually appealing to users), or by adjusting the transparency of the two-dimensional surface representing a shadow of the hand such that the virtual object under the shadow mask is still visible or partially visible, but appears darkened where the shadow of the hand appears. Such modifications create a more immersive and realistic artificial reality experience for the user.

A surface's texture data may be made up of one or more subparts, referred to herein as "texels." These texels may be blocks (e.g., rectangular blocks) that come together to create a texel array that makes up a surface. As an example and not by way of limitation, they may be contiguous blocks that make up a surface. For illustrative purposes, a texel of a surface may be conceptualized as being analogous to a pixel of an image. A surface may be generated by any suitable device. In particular embodiments, the surface may encode for visual information (RGBA) (e.g., as a texture) for one or more of its texels. The alpha component may be a value that specifies a level of transparency that is to be accorded to a texel. As an example and not by way of limitation, an alpha value of 0 may indicate that a texel is fully transparent, an alpha value of 1 may indicate that a texel is opaque, and alpha values in between may indicate a transparency level that is in between (the exact transparency level being determined by the value). A surface may support any suitable image format. To conserve resources, the surface may be transmitted as an alpha-mask that represents the occlusion and blending (e.g., transparency) of each pixel in the segmentation mask. The alpha-mask may be a low resolution texture (64×64 pixel), which reduces power consumption, provides for fuzzy (but aesthetically pleasing) borders when overlaid on an occluding object of interest 210, reduces latency due to smaller resolution, and provides for better scalability. Additionally, the computing system can blur the edges of a surface outward to prevent the core hand region from fading based on blur filtering techniques (which usually average the surrounding pixel values). Without these techniques, the edges of the user's hand (e.g., the fingers) may fade because the pixels in the box filter at the edges would not be represented as completely opaque. For example, a typical blur filter (e.g., 5×5) may determine the average opacity of the 25 pixels (e.g., sum the opacity value of each of the 25 surrounding pixels and divide by 25). Instead, particular embodiments may blur the hand outwards by summing the opacity of each of the pixels in the filter region and dividing by a smaller number (e.g., sum the opacity value of each of the 25 pixels and divide by, for example and not by way of limitation, 12). By dividing by a smaller number, the computing system may effectively decrease the threshold number of pixels needed in a box filter for the center pixel to be considered fully opaque. In these embodiments the box filter may further cap the opacity value such that the final opacity value for a pixel is always between 0 and 1. Thus, in the above example if more than 12 pixels have an opacity value of 1, then the box filter would output a final opacity of 1 (e.g., fully opaque) based on this cap. As another example, if between 1 and 12 pixels have an opacity value of 1, the box filter would output a final opacity value of between 0 and 1. This technique allows the hand to blurred outwards and prevents the hand region from fading.

In particular embodiments, a surface may be positioned and oriented in a coordinate system in three-dimensional space. In particular embodiments the coordinate system may correspond to the real environment, for example known world-locked coordinates (x, y). The world-coordinates of the surface may be based on an absolute coordinate in the artificial reality environment (e.g., at a particular x, y coordinate), or the world-coordinates of the surface may be determined relative to the pose of the HMD, the HMD, the user, a particular point on the user (e.g., an eyeball of the user), or one or more other surfaces or virtual objects in the artificial reality (e.g., posed at a coordinate relative to a wall or virtual coffee table in the artificial reality environment). The depth of a surface permits the computing system to position the surface in the artificial reality environment relative to, for example and not by way of limitation, one or more other real objects or virtual object representations in the environment. For example, the surface representing the hand 215 may be positioned at the approximate depth of the user's hand, whereas the surface representing shadow of the hand may be positioned at the approximate depth of the virtual table 210. In particular embodiments the virtual object representations may be two-dimensional surfaces as viewed from the viewpoint of the user. In this manner, proper occlusion of the hand 215 and the shadow of the hand relative to the one or more other real objects or virtual objects can be determined, for example by occluding a portion of the surface representing the hand if the hand is positioned behind a virtual object.

Figure 4:
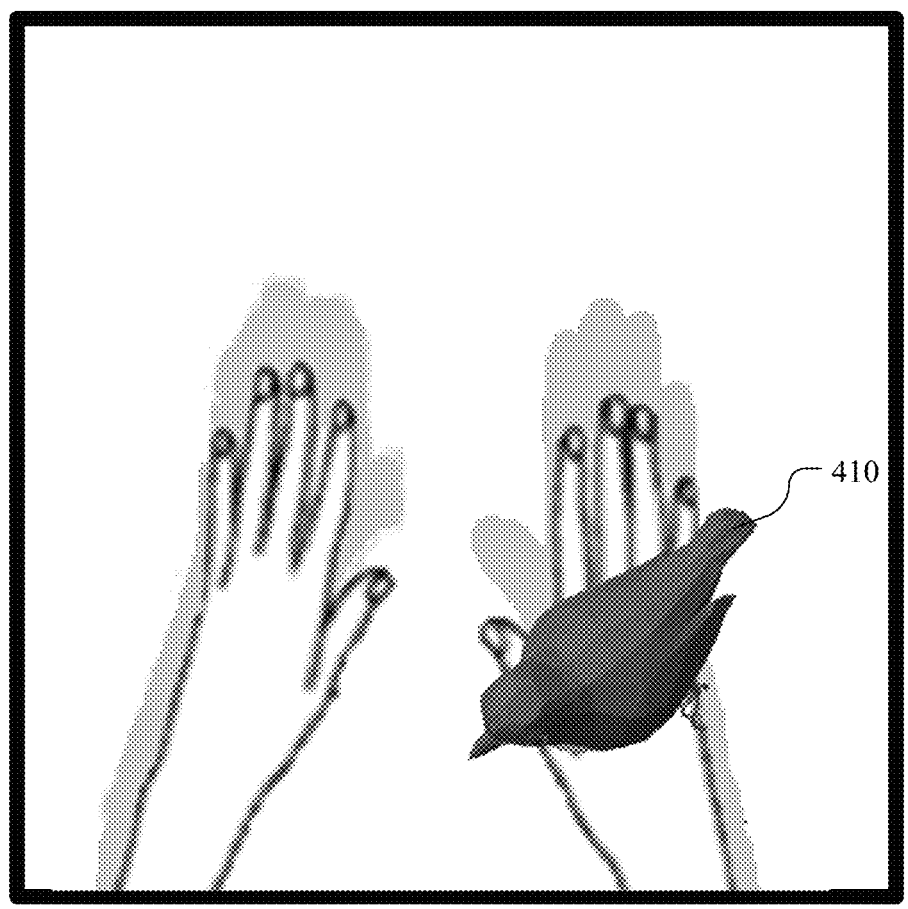
FIG. 4 illustrated an output image of a viewpoint of a scene of an artificial reality environment.

In particular embodiments, a computing system may generate an output image of a viewpoint of a scene of an artificial reality environment for display to a user that may include for example, one or more surfaces as described herein. FIG. 4 illustrated an output image of a viewpoint of a scene of an artificial reality environment. Generating the output image may be done on the GPU of the computing system by rendering a surface as viewed from user's current viewpoint for display. As an example and not by way of limitation, this output image of a viewpoint may include a set of virtual objects, for example virtual bird 410. The output image may comprise a set of image pixels that correspond to the portion of the surface that is determined to be visible. The output image may be configured to cause a display to turn off a set of corresponding display pixels such that the visible portion of the hand (or other parts of the real environment) is visible to the user when the generated output image is displayed to the user. In particular embodiments the output image may be transmitted to the HMD for display. This allows for an immersive artificial reality environment to be displayed to the user.

The output image may correspond to a viewpoint of the user based on the relative occlusions of the surfaces relative to one or more virtual objects or real objects in the artificial reality environment. The computing system may utilize a ray-casting or other rendering process, such as ray tracing, for determining visual information and location information of one or more virtual objects that are to be displayed within the initial output image of a viewpoint of a scene of an artificial reality environment. In particular embodiments, the first computing system (e.g., a laptop, a cellphone, a desktop, a wearable device) may perform this first ray-casting process to generate an output image of a viewpoint of an artificial reality environment. A "viewpoint" of an artificial reality environment may refer to a user perspective of the artificial reality environment, which may, for example, be determined based on a current position and orientation of an HMD. This use of the ray-casting process may be referred to herein as a "visibility test," because it may be used to determine a visibility of a virtual object 410 relative to the hand 215 by comparing a model of the virtual object with the surface. The ray-casting process may ultimately be used to associate pixels of the screen with points of intersection on any objects that would be visible from a particular viewpoint of an artificial reality environment.

The generated output image may be rendered by one or more components (e.g., CPU, GPU, etc.) of the computing system physically connected to the HMD. However, the HMD may have limited system resources and a limited power supply, and these limitations may not be appreciably reduced without resulting in too much weight, size, and/or heat for the user's comfort. As a result, it may not be feasible for the HMD to unilaterally handle all the processing tasks involved in rendering an output image of a viewpoint of an artificial reality environment. In particular embodiments, the one or more components may be associated with a device (e.g., a laptop, a cellphone, a desktop, a wearable device) that may be used to render the output image (e.g., perform the ray-casting process). In particular embodiments, the device is in communication with a computing system on the HMD but may be otherwise physically separated from the HMD. As an example and not by way of limitation, this device may be a laptop device that is wired to the HMD or communicates wirelessly with the HMD. As another example and not by way of limitation, the device may be a wearable (e.g., a device strapped to a wrist), handheld device (e.g., a phone), or some other suitable device (e.g., a laptop, a tablet, a desktop) that is wired to the HMD or communicates wirelessly with the HMD. In particular embodiments the device may send this output image to the HMD for display.

In particular embodiments the components of the device that generated the output image may also generate the one or more surfaces representing the hand and the shadow of the hand for a particular viewpoint. As another example and not by way of limitation, an onboard computing system of an HMD may generate the one or more surfaces after it receives the output image from a separate computing system (e.g., from a CPU or GPU of a wearable, handheld, or laptop device). In particular embodiments, there may be a predefined maximum number of surfaces that may be generated for a view (e.g., 16 surfaces) for efficiency purposes. Although this disclosure focuses on displaying an output image to a user on an AR HMD, it contemplates displaying the output image to a user on a VR display or any other suitable device.

After rendering the output image of a viewpoint of the artificial reality environment, the computing system may need to make one or more adjustments to the output image to accurately display the current viewpoint of the one or more surfaces to the user. The need for these adjustments is unique to displaying artificial reality through, for example, an AR HMD 110 that permits the user to simultaneously see-through and perceive the real environment around them. For example, because the user is experiencing the artificial reality environment in real-time, after performing the processes described herein to render the output image of the artificial reality environment for display (which may represent a first viewpoint at a first time, e.g., when the received image was captured) the computing system may be roughly 100 milliseconds behind the current viewpoint of the user. The viewpoint of the user may have changed during this time due to, for example, movements of the both the user's head (e.g., the HMD pose), movements of the user's hands 215, movements of the camera worn by the user, and/or movements of other real or virtual objects in the artificial reality environment. These movements result in a second viewpoint at a second time that is slightly different that the first viewpoint represented by the output image. In contrast, when artificial reality is displayed to a user through a traditional display (e.g., a tablet or mobile device) or through a HMD that completely occludes the user's view of the real environment (e.g., the HMD depicted in FIG. 1A), the computing system can simply delay or lag the displayed images such that the displayed images match the viewpoint needed to render and display the one or more surfaces representing detected object of interests within the artificial reality environment (e.g., the entire scene is lagged to account for this processing time).

Thus, if there is significant latency in updating the image to reflect this change in viewpoint with an artificial reality environment that allows the user to perceive the real environment around them, the user may be able to perceive the latency, creating a sensory dissonance. To prevent this dissonance, what is displayed to the user may need to account for changes in viewpoint at a very rapid rate. Moreover, re-rendering the entire artificial reality environment to account for these changes in perspective takes time. As an example and not by way of limitation, even with a powerful computing system frames may only be rendered in this way at 60 Hz, which means that any changes in perspective that occur within $\frac{1}{60}$th of a second (e.g., from a rapid head movement) would not be captured by what is rendered and displayed. Further, re-rendering the entire view to account for these changes in perspective is a resource-intensive task that may involve performing a large number of "visibility tests." to obtain visual information (e.g., color and transparency information) to generate an output image for a second viewpoint. To remedy any changes in perspective that may result in a changed viewpoint during this latency period, rather than re-generate the entire output image, the computing system may adjust the position and/or orientation of one or more surfaces in the image, for example the two-dimensional surface representing hand 215 or the two-dimensional surface representing the shadow of the hand for a particular viewpoint to efficiently deal with generating output images quickly.

The adjustments may account for predicted changes (e.g., move/translate, skew, scale, distort, or otherwise change in appearance together) that result in a change in a user's viewpoint of the artificial reality environment (e.g., resulting from a HMD on a user's head moving to a different position and/or orientation). In particular embodiments the first and second viewpoint may be based on a position and orientation of the HMD worn by the user, which may be continuously or semi-continuously by the computing system (e.g., using inertial, optical, depth, and/or other sensors on the HMD or on a remote device tracking the HMD) to determine the viewpoint of the user wearing the HMD at any given time. In particular embodiments, the computing system may also continuously or semi-continuously track the eye position of the user (e.g., to adjust for distortions resulting from lenses of the HMD that may be dependent on the user's gaze). In particular embodiments the latest viewpoint may be further determined based on the user's gaze or eye position (e.g., as determined by eye tracking).

The adjusted surfaces allow the computing system to shortcut an approximation of changes to a viewpoint by resampling the surfaces within a view (rather than re-rendering the entire generated image). In particular embodiments, resampling may involve performing a second ray-casting process to determine whether a portion of the two-dimensional surface representing the hand is visible from a second viewpoint in the three-dimensional space, and how a surface representing may look from a second viewpoint that may result from one or more movements of the user's head, hands, or other objects during this latency period.

By focusing on just resampling a limited number of surfaces within a view (e.g., 16 surfaces), the generated image can be modified quickly—and sufficiently quickly to prevent or reduce user perception of latency. As an example and not by way of limitation, further second ray-casting processes may be performed every $\frac{1}{200}$th of a second, to account for possible changes in perspective from a change in position or orientation of the HMD. In particular embodiments, the ray-casting process may be performed separately for each eye of a user to account for slight changes in the viewpoint (e.g., based on the relative positions of the eyes). As an example and not by way of limitation, the first and second ray-casting processes may be performed for a screen associated with the left eye and for a screen associated with the right eye. These processes may run independently of each other and may even function out of sync with one another.

In particular embodiments, an onboard computing system of an HMD may resample one or more of the surfaces by performing a ray-casting process to reflect the latest viewpoint of the user. If the perspective has changed since the previous ray-casting process, the imaginary rays may accordingly intersect with different points of the surface. Modifying the generated image based on resampling in this manner may only be an approximation of how the view is supposed to be altered by a change in viewpoint, and this approximation may only work for relatively small changes in viewpoint. But this may be all that is needed, because the purpose is to account for changes that happen in relatively short periods of time between when fully rendered frames are generated (e.g., on the order of a hundredth of a second). Essentially, it may be a temporary fix until an output image of the artificial reality environment can be re-generated (e.g., by a more powerful computing system such as a wearable device). As an example and not by way of limitation, a more powerful computing system that may be separate from the HMD (e.g., a wearable device secured to the user's belt or waistline) may re-generate the output image from scratch every $\frac{1}{60}$th of a second and may send these re-rendered images to the HMD device for display as they are generated. In this example, the HMD device, in the time between receiving re-rendered views every $\frac{1}{60}$th of a second, may on its own modify surfaces (e.g., every $\frac{1}{200}$th of a second) to account for rapid changes in user viewpoint.

Figure 5:
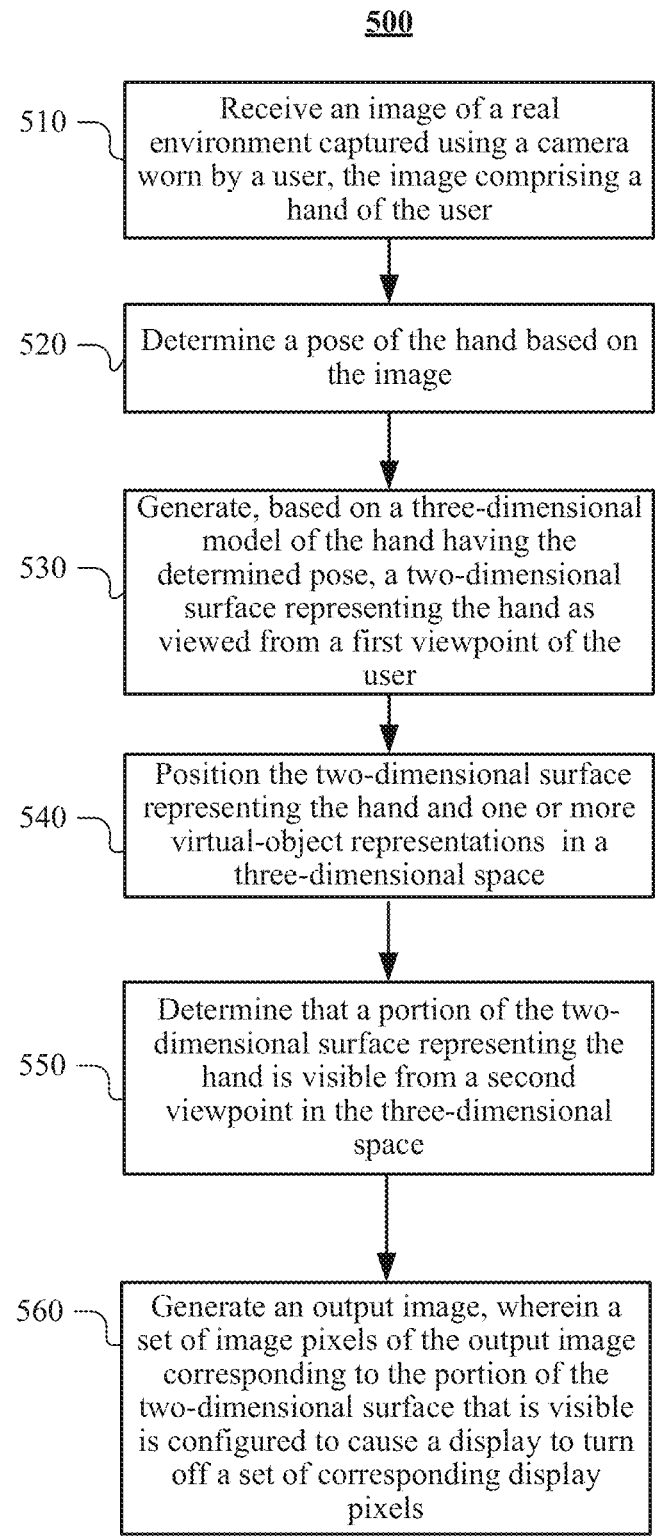
FIG. 5 illustrates an example method for generating an output image of an artificial reality environment comprising at least a portion of a representation of a hand.

FIG. 5 illustrates an example method 500 for generating an output image of an artificial reality environment com-prising at least a portion of a representation of a hand. The method may begin at step 510, where a computing system may receive an image of a real environment captured using a camera worn by a user, the image comprising a hand of the user.

At step 520, the computing system may determine a pose of the hand based on the image.

At step 530, the computing system may generate, based on a three-dimensional model of the hand having the determined pose, a two-dimensional surface representing the hand as viewed from a first viewpoint of the user.

At step 540, the computing system may position the two-dimensional surface representing the hand and one or more virtual-object representations in a three-dimensional space.

At step 550, the computing system may determine that a portion of the two-dimensional surface representing the hand is visible from a second viewpoint in the three-dimensional space.

At step 560, the computing system may generate an output image, wherein a set of image pixels of the output image corresponding to the portion of the two-dimensional surface that is visible is configured to cause a display to turn off a set of corresponding display pixels.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating an output image of an artificial reality environment comprising at least a portion of a representation of a hand including the particular steps of the method of FIG. 5, this disclosure contemplates any suitable method for generating an output image of an artificial reality environment comprising at least a portion of a representation of a hand including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
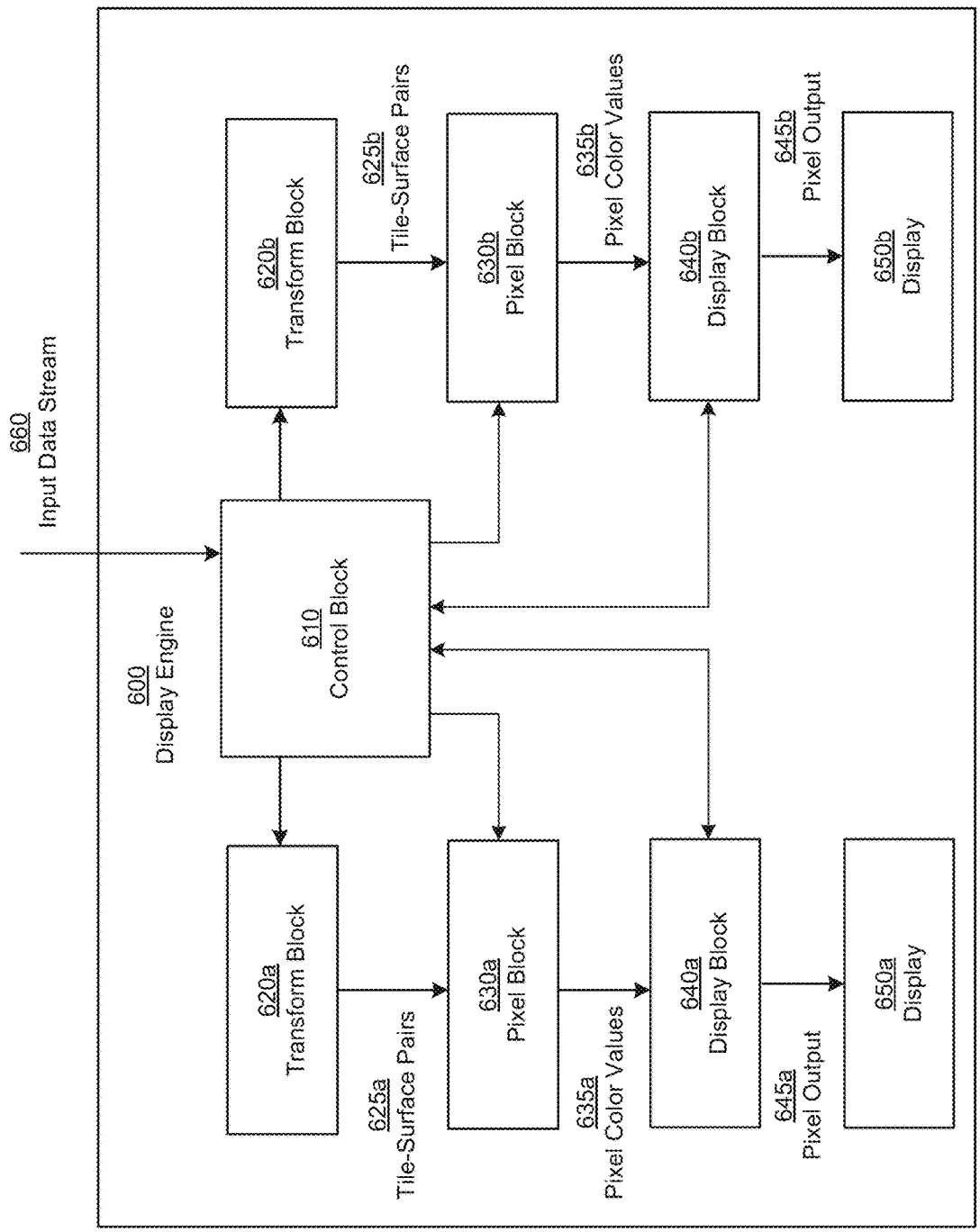
FIG. 6 illustrates a system diagram for a display engine.

FIG. 6 illustrates a system diagram for a display engine 600. The display engine 600 may comprise four types of top level blocks. As shown in FIG. 6, these blocks may include a control block 610, transform blocks 620a and 620b, pixel blocks 630a and 630b, and display blocks 640a and 640b. One or more of the components of the display engine 600 may be configured to communicate via one or more high-speed bus, shared memory, or any other suitable method. As shown in FIG. 6, the control block 610 of display engine 600 may be configured to communicate with the transform blocks 620a and 620b and pixel blocks 630a and 630b. Display blocks 640a and 640b may be configured to communicate with the control block 610. As explained in further detail herein, this communication may include data as well as control signals, interrupts and other instructions.

In particular embodiments, the control block 610 may receive an input data stream 660 from a primary rendering component and initialize a pipeline in the display engine 600 to finalize the rendering for display. In particular embodiments, the input data stream 660 may comprise data and control packets from the primary rendering component. The data and control packets may include information such as one or more surfaces comprising texture data and position data and additional rendering instructions. The control block 610 may distribute data as needed to one or more other blocks of the display engine 600. The control block 610 may initiate pipeline processing for one or more frames to be displayed. In particular embodiments, a HMD may comprise multiple display engines 600 and each may comprise its own control block 610.

In particular embodiments, transform blocks 620*a* and 620*b* may determine initial visibility information for surfaces to be displayed in the view of the artificial reality environment. In general, transform blocks (e.g., the transform blocks 620*a* and 620*b*) may cast rays from pixel locations on the screen and produce filter commands (e.g., filtering based on bilinear or other types of interpolation techniques) to send to pixel blocks 630*a* and 630*b*. Transform blocks 620*a* and 620*b* may perform ray casting from the current viewpoint of the user (e.g., determined using inertial measurement units, eye trackers, and/or any suitable tracking/localization algorithms, such as simultaneous localization and mapping (SLAM)) into the artificial scene where surfaces are positioned and may produce results to send to the respective pixel blocks (630*a* and 630*b*).

In general, transform blocks 620*a* and 620*b* may each comprise a four-stage pipeline, in accordance with particular embodiments. The stages of a transform block may proceed as follows. A ray caster may issue ray bundles corresponding to arrays of one or more aligned pixels, referred to as tiles (e.g., each tile may include 16×16 aligned pixels). The ray bundles may be warped, before entering the artificial reality environment, according to one or more distortion meshes. The distortion meshes may be configured to correct geometric distortion effects stemming from, at least, the displays 650*a* and 650*b* of the HMD. Transform blocks 620*a* and 620*b* may determine whether each ray bundle intersects with surfaces in the artificial reality environment by comparing a bounding box of each tile to bounding boxes for each surface. If a ray bundle does not intersect with an object, it may be discarded. Tile-surface intersections are detected, and corresponding tile-surface pair 625*a* and 625*b* are passed to pixel blocks 630*a* and 630*b*.

In general, pixel blocks 630*a* and 630*b* determine color values from the tile-surface pairs 625*a* and 625*b* to produce pixel color values, in accordance with particular embodiments. The color values for each pixel are sampled from the texture data of surfaces received and stored by the control block 610 (e.g., as part of input data stream 660). Pixel blocks 630*a* and 630*b* receive tile-surface pairs 625*a* and 625*b* from transform blocks 620*a* and 620*b*, respectively, and schedule bilinear filtering. For each tile-surface pair 625*a* and 625*b*, pixel blocks 630*a* and 630*b* may sample color information for the pixels within the tile using color values corresponding to where the projected tile intersects the surface. In particular embodiments, pixel blocks 630*a* and 630*b* may process the red, green, and blue color components separately for each pixel. Pixel blocks 630*a* and 630*b* may then output pixel color values 635*a* and 635*b*, respectively, to display blocks 640*a* and 640*b*.

In general, display blocks 640*a* and 640*b* may receive pixel color values 635*a* and 635*b* from pixel blocks 630*a* and 630*b*, converts the format of the data to be more suitable for the scanline output of the display, apply one or more brightness corrections to the pixel color values 635*a* and 635*b*, and prepare the pixel color values 635*a* and 635*b* for output to the displays 650*a* and 650*b*. Display blocks 640*a* and 640*b* may convert tile-order pixel color values 635*a* and 635*b* generated by pixel blocks 630*a* and 630*b* into scanline- or row-order data, which may be required by the displays 650*a* and 650*b*. The brightness corrections may include any required brightness correction, gamma mapping, and dithering. Display blocks 640*a* and 640*b* may provide pixel output 645*a* and 645*b*, such as the corrected pixel color values, directly to displays 650*a* and 650*b* or may provide the pixel output 645*a* and 645*b* to a block external to the display engine 600 in a variety of formats. For example, the HMD may comprise additional hardware or software to further customize backend color processing, to support a wider interface to the display, or to optimize display speed or fidelity.

Figure 7:
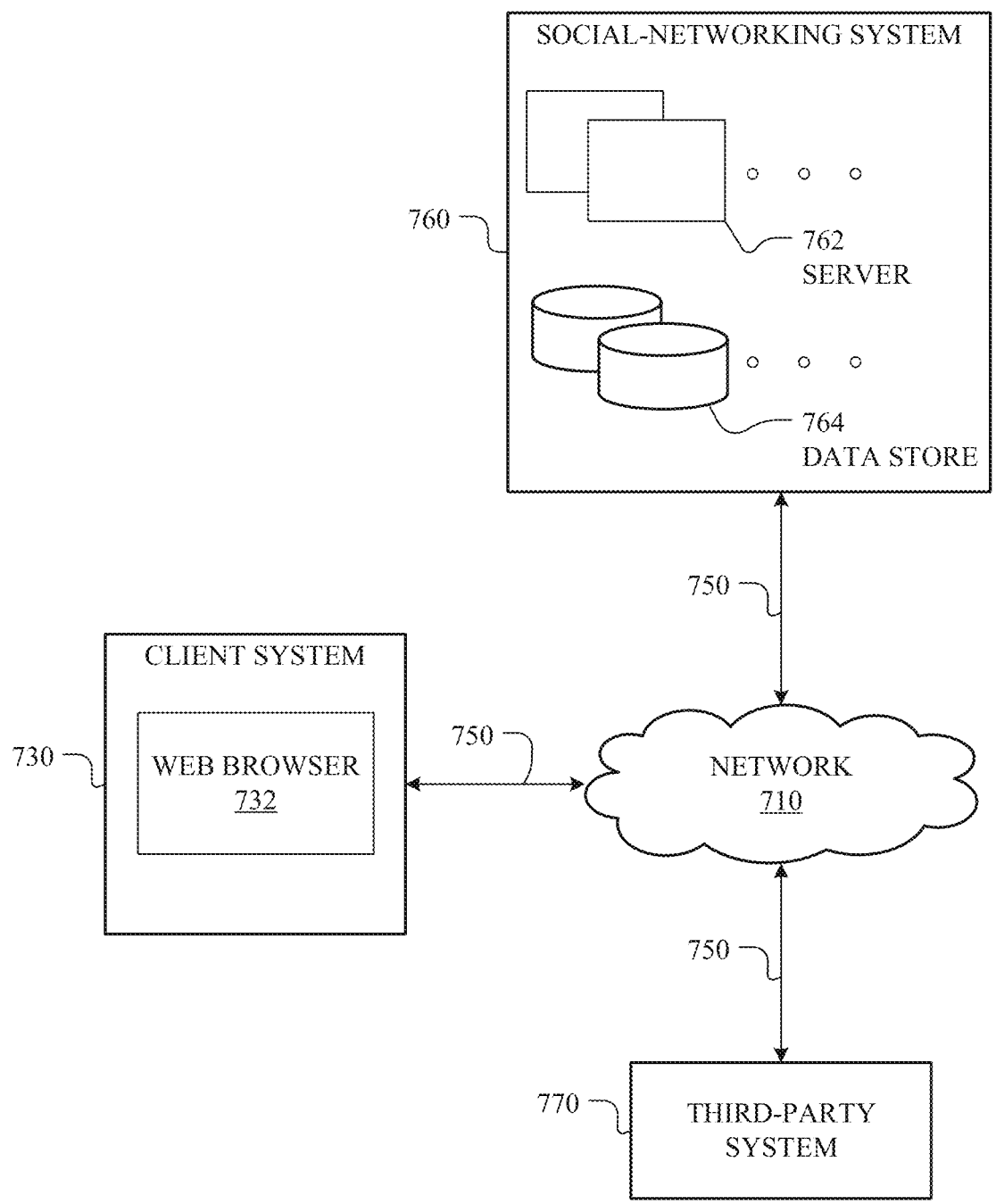
FIG. 7 illustrates an example network environment associated with a social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 may include a web browser 732, and may have one or more add-ons, plug-ins, or other extensions. A user at client system 730 may enter a Uniform Resource Locator (URL) or other address directing the web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to client system 730 one or more Hyper Text Markup Language (HTML) files responsive to the HTTP request. Client system 730 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 760 may be a network-addressable computing system that can host an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. As an example and not by way of limitation, client system 730 may access social-networking system 760 using a web browser 732, or a native application associated with social-networking system 760 (e.g., a mobile social-networking application, a messaging application, another suitable application, or any combination thereof) either directly or via network 710. In particular embodiments, social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 to whom they want to be connected. Herein, the term "friend" may refer to any other user of social-networking system 760 with whom a user has formed a connection, association, or relationship via social-networking system 760.

In particular embodiments, social-networking system 760 may provide users with the ability to take actions on various types of items or objects, supported by social-networking system 760. As an example and not by way of limitation, the items and objects may include groups or social networks to which users of social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 760 or by an external system of third-party system 770, which is separate from social-networking system 760 and coupled to social-networking system 760 via a network 710.

In particular embodiments, social-networking system 760 may be capable of linking a variety of entities. As an example and not by way of limitation, social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking system 760. In particular embodiments, however, social-networking system 760 and third-party systems 770 may operate in conjunction with each other to provide social-networking services to users of social-networking system 760 or third-party systems 770. In this sense, social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 760 also includes user-generated content objects, which may enhance a user's interactions with social-networking system 760. User-generated content may include anything a user can add, upload, send, or "post" to social-networking system 760. As an example and not by way of limitation, a user communicates posts to social-networking system 760 from a client system 730. Posts may include data such as status updates or other textual data, location information, photos, videos, links, music or other similar data or media. Content may also be added to social-networking system 760 by a third-party through a "communication channel," such as a newsfeed or stream.

In particular embodiments, social-networking system 760 may include a variety of servers, sub-systems, programs, modules, logs, and data stores. In particular embodiments, social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 760 may also include suitable components such as network interfaces, security mechanisms, load balancers, failover servers, management-and-network-operations consoles, other suitable components, or any suitable combination thereof. In particular embodiments, social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 760 to one or more client systems 730 or one or more third-party system 770 via network 710. The web server may include a mail server or other messaging functionality for receiving and routing messages between social-networking system 760 and one or more client systems 730. An API-request server may allow a third-party system 770 to access information from social-networking system 760 by calling one or more APIs. An action logger may be used to receive communications from a web server about a user's actions on or off social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking system 760. A privacy setting of a user determines how particular information associated with a user can be shared. The authorization server may allow users to opt in to or opt out of having their actions logged by social-networking system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
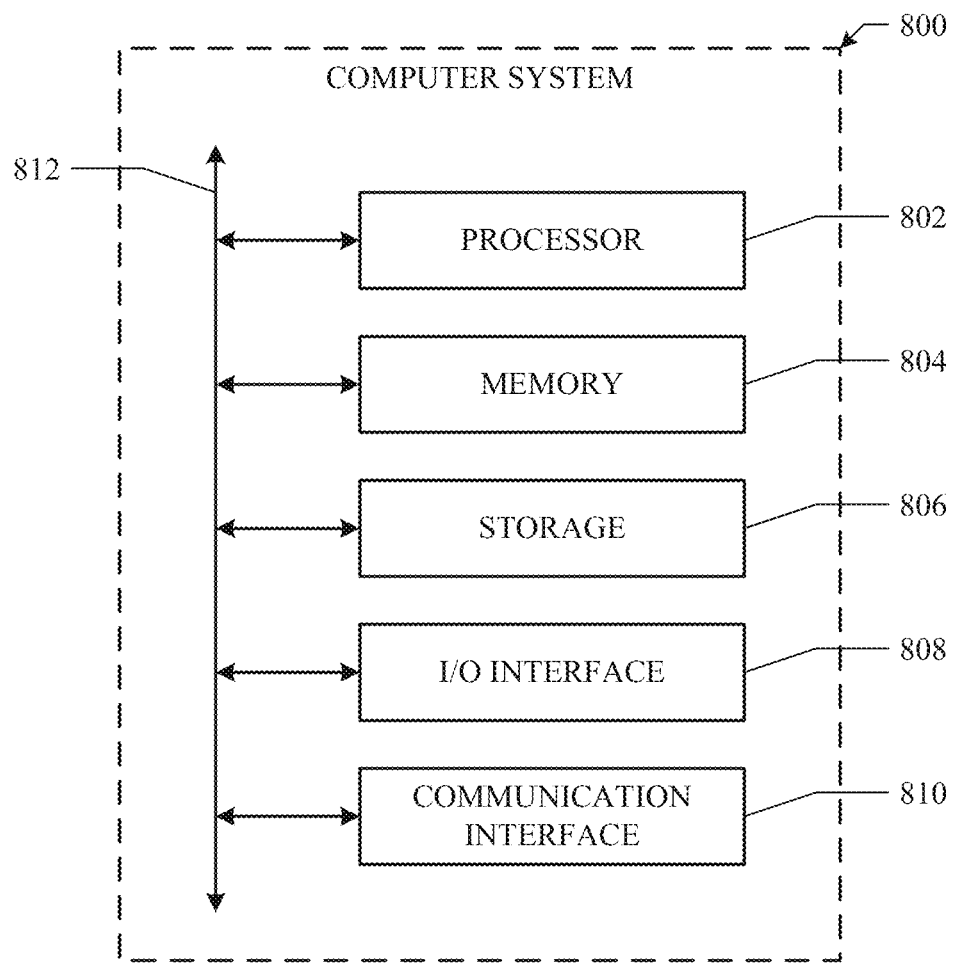
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving an image of a real environment captured using a camera worn by a user, the image comprising a hand of the user;
   determining a pose of the hand based on the image and a light direction of a light source;
   generating, based on a three-dimensional model of the hand having the determined pose, a first two-dimensional surface representing the hand as viewed from a first viewpoint of the user;
   projecting, according to the light direction, the three-dimensional model of the hand having the determined pose onto one or more virtual objects;
   generating a second two-dimensional surface representing a shadow of the hand on the one or more virtual objects as viewed from the first viewpoint of the user;
   positioning the first two-dimensional surface representing the hand, the second two-dimensional surface representing the shadow of the hand on the one or more virtual objects, and one or more virtual-object representations of the one or more virtual objects in a three-dimensional space;
   determining that a first portion of the first two-dimensional surface representing the hand and a second portion of the second two-dimensional surface representing the shadow of the hand are visible from a second viewpoint in the three-dimensional space; and generating an output image, wherein (1) a first set of image pixels of the output image corresponding to the portion of the first portion of the first two-dimensional surface that is visible is configured to cause a display to turn off a set of corresponding display pixels, and (2) a second set of image pixels of the output image is generated using the second portion of the second two-dimensional surface and one or more associated transparency levels.

2. The method of claim 1, wherein generating the first two-dimensional surface comprises:
projecting vertices of the three-dimensional model of the hand onto an image plane associated with the first viewpoint;
generating a bounding box in the image plane surrounding the projected vertices; and
rendering a texture for the first two-dimensional surface based on the bounding box.

3. The method of claim 1, further comprising detecting one or more keypoints of the hand in the image; wherein the pose of the hand is determined based on the one or more keypoints and a camera pose of the camera when capturing the image.

4. The method of claim 1, further comprising determining, based on the image, a distance of the hand from the camera; wherein a size of the generated first two-dimensional surface is based on the distance.

5. The method of claim 1, wherein positioning the first two-dimensional surface comprises adjusting a position or orientation of the first two-dimensional surface to account for a change in perspective of the hand, the change in perspective resulting from:
one or more movements of the camera worn by the user subsequent to a time the received image is captured; or
one or more movements of the hand subsequent to the time the received image is captured.

6. The method of claim 5, wherein positioning the first two-dimensional surface is performed by one or more components of the computing system that are physically connected to a headset worn by the user.

7. The method of claim 1, wherein the camera worn by the user is connected to a head-mounted display.

8. One or more computer-readable non-transitory storage media embodying software that is operable when executed to:
receive an image of a real environment captured using a camera worn by a user, the image comprising a hand of the user;
determine a pose of the hand based on the image and a light direction of a light source;
generate, based on a three-dimensional model of the hand having the determined pose, a first two-dimensional surface representing the hand as viewed from a first viewpoint of the user;
project, according to the light direction, the three-dimensional model of the hand having the determined pose onto one or more virtual objects;
generate a second two-dimensional surface representing a shadow of the hand on the one or more virtual objects as viewed from the first viewpoint of the user;
position the first two-dimensional surface representing the hand, the second two-dimensional surface representing the shadow of the hand on the one or more virtual objects, and one or more virtual-object representations of the one or more virtual objects in a three-dimensional space;
determine that a first portion of the first two-dimensional surface representing the hand and a second portion of the second two-dimensional surface representing the shadow of the hand are visible from a second viewpoint in the three-dimensional space; and
generate an output image, wherein (1) a first set of image pixels of the output image corresponding to the portion of the first portion of the first two-dimensional surface that is visible is configured to cause a display to turn off a set of corresponding display pixels, and (2) a second set of image pixels of the output image is generated using the second portion of the second two-dimensional surface and one or more associated transparency levels.

9. The media of claim 8, wherein the software is further operable when executed to:
project vertices of the three-dimensional model of the hand onto an image plane associated with the first viewpoint;
generate a bounding box in the image plane surrounding the projected vertices; and
render a texture for the first two-dimensional surface based on the bounding box.

10. The media of claim 8, wherein the software is further operable when executed to determine, based on the image, a distance of the hand from the camera;
wherein a size of the generated first two-dimensional surface is based on the distance.

11. The media of claim 8, wherein the software is further operable when executed to adjust a position or orientation of the first two-dimensional surface to account for a change in perspective of the hand, the change in perspective resulting from:
one or more movements of the camera worn by the user subsequent to a time the received image is captured; or
one or more movements of the hand subsequent to the time the received image is captured.

12. A system comprising:
one or more processors; and
one or more computer-readable non-transitory storage media coupled to one or more of the processors and comprising instructions operable when executed by one or more of the processors to cause the system to:
receive an image of a real environment captured using a camera worn by a user, the image comprising a hand of the user;
determine a pose of the hand based on the image and a light direction of a light source;
generate, based on a three-dimensional model of the hand having the determined pose, a first two-dimensional surface representing the hand as viewed from a first viewpoint of the user;
project, according to the light direction, the three-dimensional model of the hand having the determined pose onto one or more virtual objects;
generate a second two-dimensional surface representing a shadow of the hand on the one or more virtual objects as viewed from the first viewpoint of the user;
position the first two-dimensional surface representing the hand, the second two-dimensional surface representing the shadow of the hand on the one or more virtual objects, and one or more virtual-object representations of the one or more virtual objects in a three-dimensional space;
determine that a first portion of the first two-dimensional surface representing the hand and a second portion of the second two-dimensional surface representing the shadow of the hand are visible from a second viewpoint in the three-dimensional space; and generate an output image, wherein (1) a first set of image pixels of the output image corresponding to the portion of the first portion of the first two-dimensional surface that is visible is configured to cause a display to turn off a set of corresponding display pixels, and (2) a second set of image pixels of the output image is generated using the second portion of the second two-dimensional surface and one or more associated transparency levels.

13. The system of claim 12, wherein the processors are further operable when executing the instructions to:

project vertices of the three-dimensional model of the hand onto an image plane associated with the first viewpoint;

generate a bounding box in the image plane surrounding the projected vertices; and render a texture for the first two-dimensional surface based on the bounding box.

14. The system of claim 12, wherein the processors are further operable when executing the instructions to determine, based on the image, a distance of the hand from the camera; wherein a size of the generated first two-dimensional surface is based on the distance.

* * * * *